US012613858B2

(12) United States Patent
Garg et al.

(10) Patent No.: US 12,613,858 B2
(45) Date of Patent: *Apr. 28, 2026

(54) CONSOLIDATING CHANGE REQUESTS IN DATA HIERARCHIES

(71) Applicant: Oracle International Corporation, Redwood Shores, CA (US)

(72) Inventors: Anurag Garg, Cupertino, CA (US); Douglas Ray Cosby, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,221

(22) Filed: Sep. 24, 2024

(65) Prior Publication Data

US 2025/0013627 A1     Jan. 9, 2025

Related U.S. Application Data

(63) Continuation of application No. 18/072,581, filed on Nov. 30, 2022, now Pat. No. 12,124,427.

(51) Int. Cl.
*G06F 16/23* (2019.01)
*G06F 16/22* (2019.01)
(52) U.S. Cl.
CPC ...... *G06F 16/2358* (2019.01); *G06F 16/2246* (2019.01); *G06F 16/2379* (2019.01)
(58) Field of Classification Search
None
See application file for complete search history.

(56) References Cited

U.S. PATENT DOCUMENTS

| | | | |
|---|---|---|---|
| 9,063,980 B2 | 6/2015 | Dhamankar et al. | |
| 10,671,641 B1 * | 6/2020 | Holenstein | ............ G06F 16/284 |
| 2006/0195456 A1 | 8/2006 | Fang et al. | |
| 2012/0143825 A1 | 6/2012 | Boehm et al. | |
| 2017/0116298 A1 | 4/2017 | Ravipati et al. | |

(Continued)

OTHER PUBLICATIONS

U.S. Appl. No. 18/072,581, Non-Final Office Action mailed on Jan. 31, 2024, 29 pages.

(Continued)

*Primary Examiner* — Kavita Stanley
*Assistant Examiner* — Cao D Vuong
(74) *Attorney, Agent, or Firm* — Kilpatrick Townsend & Stockton LLP

(57) ABSTRACT

A data hierarchy including individual data nodes may be used to represent a wide variety of data collections. Requests to change or add nodes in the data hierarchy may be received from many different sources over time. Instead of considering these change requests individually, an interface allows a plurality of change requests to be consolidated together into a single consolidated request. The consolidated request may be displayed in an interface such that changes from each of the original requests may be displayed together in an interface so that a cumulative effect of each of the change requests may be considered before the data changes are committed to the underlying data structure. The consolidated request may maintain links and update underlying data objects representing each of the original requests to provide a record of actions related to the consolidated request.

20 Claims, 15 Drawing Sheets

(56) References Cited

U.S. PATENT DOCUMENTS

| | | | |
|---|---|---|---|
| 2018/0089250 A1 | 3/2018 | Collins et al. | |
| 2018/0150478 A1* | 5/2018 | Wang ................... | G06F 16/185 |
| 2019/0236085 A1 | 8/2019 | Galitsky | |
| 2022/0045915 A1 | 2/2022 | Prakash et al. | |
| 2022/0382743 A1* | 12/2022 | Budovski .............. | G06F 16/215 |
| 2023/0168968 A1 | 6/2023 | Karthik et al. | |

OTHER PUBLICATIONS

U.S. Appl. No. 18/072,581, Notice of Allowance mailed on Jun. 24, 2024, 10 pages.

* cited by examiner

1000

1002

Receive a first request to change a first data node in a data hierarchy

1004

Receive a second request to change a second data node in the data hierarchy

1006

Consolidate the first request and the second request together into a consolidated request

1008

Cause the consolidated request to be displayed together in the data hierarchy in an interface

CONSOLIDATING CHANGE REQUESTS IN DATA HIERARCHIES

CROSS-REFERENCE TO RELATED APPLICATIONS

This application is a continuation of U.S. nonprovisional application Ser. No. 18/072,581, filed Nov. 30, 2022, which is incorporated herein by reference.

BACKGROUND

Organizations generate large quantities of data that must be maintained and updated over time to be useful. For example, data objects representing real-world concepts may be updated over time to mirror real-world changes. Structures represented by data hierarchies may also evolve over time, thereby requiring the underlying data hierarchies to add remove nodes and alter existing data relationships. Data transactions may generate additional data nodes in the hierarchy that are continuously rolled up and have ripple effects throughout the data hierarchy. In a broad sense, every aspect of an organization that describes and supports the functions of the enterprise generates data. Updating and analyzing the data—which is often quantified in the tera-bytes—is vital to improve functioning of the underlying computer systems.

SUMMARY

A data hierarchy including individual data nodes may be used to represent a wide variety of data collections. Requests to change or add nodes in the data hierarchy may be received from many different sources over time. Instead of considering these change requests individually, an interface allows a plurality of change requests to be consolidated together into a single consolidated request. The consolidated request may be displayed in an interface such that changes from each of the original requests may be displayed together in an interface so that a cumulative effect of each of the change requests may be considered before the data changes are committed to the underlying data structure. The consolidated request may maintain links and update underlying data objects representing each of the original requests to provide a record of actions related to the consolidated request.

The user interface may provide a display that allows individual change requests to be viewed within the context of the larger data hierarchy. For example, when viewing a request to add a new node, a graphical representation of the data hierarchy may be displayed with the new node embedded in a specified location within the data hierarchy. Property changes may be highlighted for the new node and editable within the interface. The interface may display a list of change requests that are made within the same view of the data hierarchy. A selection of individual requests may then be consolidated into a consolidated request, and all of the original data from this request may be copied into the new consolidated request object. When the consolidation occurs, the previous records may be made "read-only" such that new changes are made through the consolidated request. The consolidated request may also include bidirectional links back to the original requests to maintain a persistent change log trail for the original submitters.

When viewing the consolidated request, multiple new nodes may be viewed simultaneously in the graphical display of the data hierarchy. Properties changed by the consolidated request may be displayed together in the property list. This allows the user to view the cumulative effect of a batch of changes before the changes are approved and committed to the database. For example, rolled up values from new nodes having a common ancestor node may be aggregated together before they are committed to the database. Validation rules for the common ancestor node may be evaluated based on the addition of all proposed new nodes. A decision may then be made whether approvingly batch of change requests together will violate a validation rule instead of approving individual change requests until the violation occurs.

The consolidation algorithm for generating the new consolidated request may implement data survivorship rules that detect and resolve data collisions. When multiple change requests propose changes to the same property, the rules may be implemented by the consolidation algorithm to determine which changes are given priority. An attachment file in the consolidated request object may maintain a record of change requests that are applied, change requests that are rejected by the consolidation rules, and any actions taken by user to override the automatic behavior of the consolidation algorithm.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for consolidating change requests in a data hierarchy. A data hierarchy including individual data nodes may be used to represent a wide variety of data collections. Requests to change or add nodes in the data hierarchy may be received from many different sources over time. Instead of considering these change requests individually, an interface allows a plurality of change requests to be consolidated together into a single consolidated request. The consolidated request may be displayed in an interface such that changes from each of the original requests may be displayed together in an interface so that a cumulative effect of each of the change requests may be considered before the data changes are committed to the underlying data structure. The consolidated request may maintain links and update underlying data objects representing each of the original requests to provide a record of actions related to the consolidated request.

Figure 1:
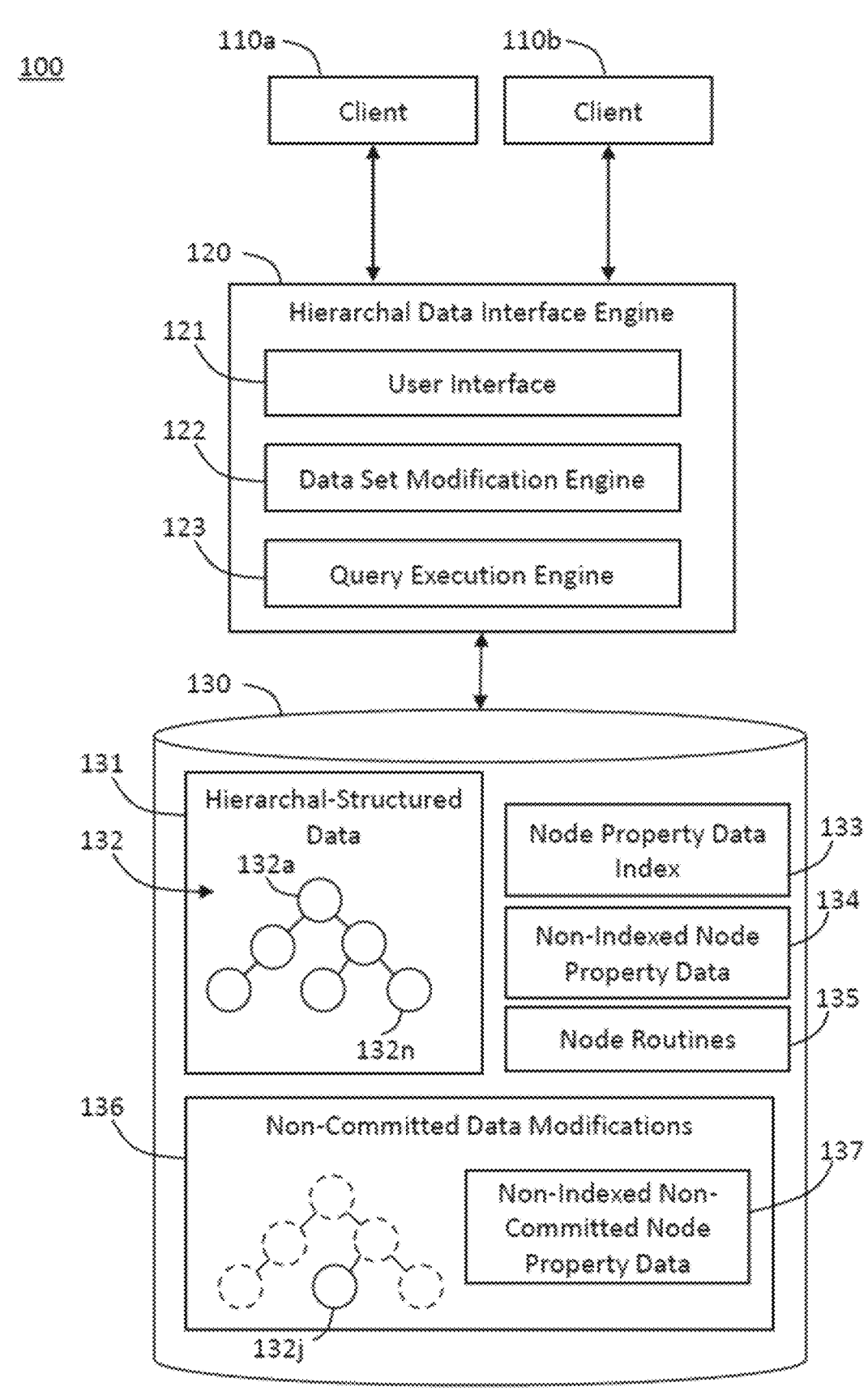
FIG. 1 illustrates a system for storing and maintaining data nodes organized in a data hierarchy, accordance according to some embodiments.

FIG. 1 illustrates a system 100 for storing and maintaining data nodes organized in a data hierarchy, accordance according to some embodiments. As illustrated in FIG. 1, the system 100 may include clients 110a, 110b that communicate with a hierarchal data interface engine 120 to access and modify data in a data repository 130. In some embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Examples of clients 110a and 110b include computing devices and networks of computing devices. For example, an enterprise, such as a company, may include multiple organizations that access the hierarchal data interface engine 120. In addition, an organization may include multiple users that access the hierarchal data interface engine 120 via personal computing devices, such as desktop computers or mobile computing devices.

In some embodiments, data, accessible by the hierarchal data interface engine 120, may be stored in the data repository 130 as a hierarchal data structure 131. The hierarchal data structure 131 may include a plurality of nodes 132. Each node may include a data structure of a particular type representing a particular entity. Examples of entities include "employee," "customer," "account," "cost center," and "city." An example of a hierarchy includes a "product line" type parent node, two "product"-type child nodes, a separate "product development team" and "sales team"-type child node for each "product"-type node, and "employee"-type nodes for each "product development team" and "sales team"-type node. Each node may be defined by a set of node properties. For example, an "employee" type node may include node properties: "employee name," "employee class," "employee title," "salary," "residence," "contact information," "supervisor," and "department." In another example, a node-type "product" may include node properties: "product name," "product type," "manufacturing group," "marketing group," and "development group." Different node types typically include different sets of respective node properties. Some node properties may overlap among multiple different node types. Other node properties of one node type may be non-overlapping with node properties of one or more other node types.

The query execution engine 123 may receive queries to the hierarchal-structured data 131 and executes the queries to return queried data including content stored in the nodes 132 of the hierarchal-structured data 131. The hierarchal data interface engine 120 may generate a node property data index 133 that describes relationships among node properties and nodes. The node property data index 133 may include one or more tables. For example, one table may represent one node type and the node properties associated with the node type. The hierarchal-structured data 131 may also include non-indexed node property data 134 (illustrated separately from the hierarchal-structured data 131 for purposes of description). Non-indexed node property data 134 includes node properties that are not indexed to a particular node. A value for a non-indexed node property may be derived from a value for an indexed-node property. Derived node property data may be data that is not stored in a field associated with the node, such as a set of fields describing the node properties of the node, but that may be obtained by applying a mathematical or logical formula to a value in the set of fields describing the node properties. Another type of non-indexed node property may be an inherited node property that a child node may inherit from a parent node in the hierarchal-structured data 131.

The data repository may store non-committed data modifications 136 to the hierarchal-structure data 131. A non-committed data modification 136 a modification proposed by a client 110a or 110b to change a node property of a node 132j, such as changing a value, adding a node, removing a node, and changing a location of a node within the node hierarchy. The proposed modifications to the hierarchal-structured data are need not be indexed in the node property data index 133. When a client 110a or 110b proposes a modification to the hierarchal-structured data 131, the data set modification engine 122 may store the non-indexed non-committed node property data 137 as a request. The data set modification engine 122 may also create a node routine 135 pointing to the non-indexed non-committed node property data 137. When a query includes indexed node property data, the query execution engine 123 may execute a node routine 135 to return, in addition or in the alternative to the indexed node property data, the non-indexed noncommitted node property data 137.

The hierarchal data interface engine 120 may include a user interface 121 that renders displays for allowing the clients 110a and 110b to access and modify the data in the data repository 130. For example, the user interface may render a page that allows a user to select: (a) from among a plurality of views for viewing the data in the data repository 130, where each view presents different sets of data or displays the data in a different way, (b) requests for modifying data in the data repository 130, (c) applications accessing the data in the data repository 130, (d) node types, hierarchy sets, and node sets of nodes, or data structures, in the data repository 130, and (e) reports and audits associated with data in the data repository 130.

The data set modification engine 122 allows a user to modify data in the data repository 130. For example, the hierarchal data interface engine 120 may receive an input via the user interface 121 to (a) add or remove a node property to a particular node type, (b) modify a value of node property of particular node stored in the data repository 130, (c) change the hierarchal structure of the data set by adding or removing nodes or changing node dependencies. In some embodiments, any changes to the hierarchal-structured data 131 may be generated as proposed changes that are implemented subject to approval by a user having a requisite authority. In addition, or in the alternative, proposed changes may be implemented after a predetermined period of time or at pre-defined times.

In one or more embodiments, a data repository 130 may include any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the hierarchal data interface engine 120. Alternatively or additionally, a data repository 130 may be implemented or executed on a computing system separate from the hierarchal data interface engine 120. A data repository 130 may be communicatively coupled to the hierarchal data interface engine 120 via a direct connection or via a network.

Information describing the hierarchal-structured data 131 may be implemented across any of components within the system 100. However, this information is illustrated within the data repository 130 for purposes of clarity and explanation. In some embodiments, the hierarchal data interface engine 120 may be implemented on one or more digital devices. The term "digital device" may refer to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 121 refers to hardware and/or software configured to facilitate communications between a user and the hierarchal data interface engine 120. The interface 121 may render user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, the clients 110a and 110b may be tenants of the same set of computing resources. A tenant is a corporation, organization, enterprise, or other entity that accesses a shared computing resource, such as application the hierarchal data interface engine 120 and the data repository 130. In an embodiment, clients 110a and 110b are tenants that are independent from each other. A business or operation of client 110a is separate from a business or operation of tenant client 110b.

While FIG. 1 illustrates an embodiment in which a system identifies indexed node property data associated with nodes in a hierarchal data structure, embodiments include data sets that are not necessarily organized in a hierarchal node structure. For example, a database may store data in one or more tables or data objects. Each table or data object may include a plurality of fields storing values associated with attributes. The attributes may correspond to characteristics associated with the table. For example, a table may be associated with an entity, and table attributes may correspond to values associated with the entity. An index may store data associated with the one or more tables, including particular sets of attributes which are associated with respective tables in the database.

The system 100 described above, and in particular the user interface 121, may be used to maintain and update the data hierarchy stored in the hierarchal data structure 131. As used herein, the term "data hierarchy" may refer to any collection of data nodes that are related to each other through parent-child relationships. While these relationships in a data hierarchy provide many benefits, such as data rollups for ancestor nodes and properties applied to descendant nodes, these relationships also increase the complexity of managing changes to the data hierarchy. For example, although data relationships may provide the benefit of automatically propagating changes throughout a data hierarchy when a single node is updated, this complicates the way that multiple changes from various sources are evaluated before being committed to the data structure. Changes from different sources that accumulate over time may have unintended cumulative effects on the data hierarchy that are impossible to evaluate when these data changes are only considered individually.

For example, changes to the data hierarchy are often received continuously over time, yet only evaluated at predetermined intervals. Change requests received over a two-week interval may be evaluated together and decisions may be made individually at the conclusion of the two week interval whether to commit each of the changes to the database. These change requests may often number in the hundreds or even thousands, depending on the size of the organization and the length of the evaluation interval. The conflicts and the cumulative effects of these changes may have undesirable effects when they are only considered individually. For example, the evaluation interval may include two different requests that each add nodes to the data hierarchy (e.g., adding nodes representing divisions to an organizational structure). When evaluated alone, each of these is change requests from different sources may appear to make only incremental changes that are acceptable in the overall data hierarchy. However, when both change requests are committed together, they may have ripple effects that are undesirable. For example, committing both changes to the database may violate validation rules for ancestor nodes. Values from the new nodes that roll up throughout the hierarchy may aggregate in ways that are expected. Most importantly, when these unexpected or undesirable results are detected, the database and computer system are often required to rollback and undo the committed changes to the database. This causes the database to reduce its availability, results in data errors in attempting to rollback the changes to the database, and consumes scarce computing resources.

The embodiments described herein solve these and other technical problems associated with committing a plurality of change requests to a data hierarchy. Specifically, instead of considering and displaying the effects of each change request individually, these embodiments allow a plurality of individual change requests to be consolidated together to form a consolidated request. The consolidated request may be considered and reviewed as a single change request that incorporates all of the changes from the individual change requests. These changes may be displayed together, and the cumulative effects of the consolidated change request may be viewed in the user interface 121. This provides a new way of displaying and managing data that was not previously available to users. The data generated for the interface allows the undesirable or unexpected results of committing multiple change requests to be evaluated before the data is committed. This in turn prevents commits that later have to be rolled back, thereby improving the availability of the database, reducing data errors, and reducing the unnecessary use of computing resources by the database system.

The following figures illustrate example graphical user interfaces that illustrate how a plurality of individual change requests can be consolidated into a consolidated request and evaluated together. It should be understood that these example user interfaces are not meant to be limiting, and other graphical designs or data presentations may be used to provide the same functions for generating consolidated change requests within the scope of some embodiments.

Figure 2:
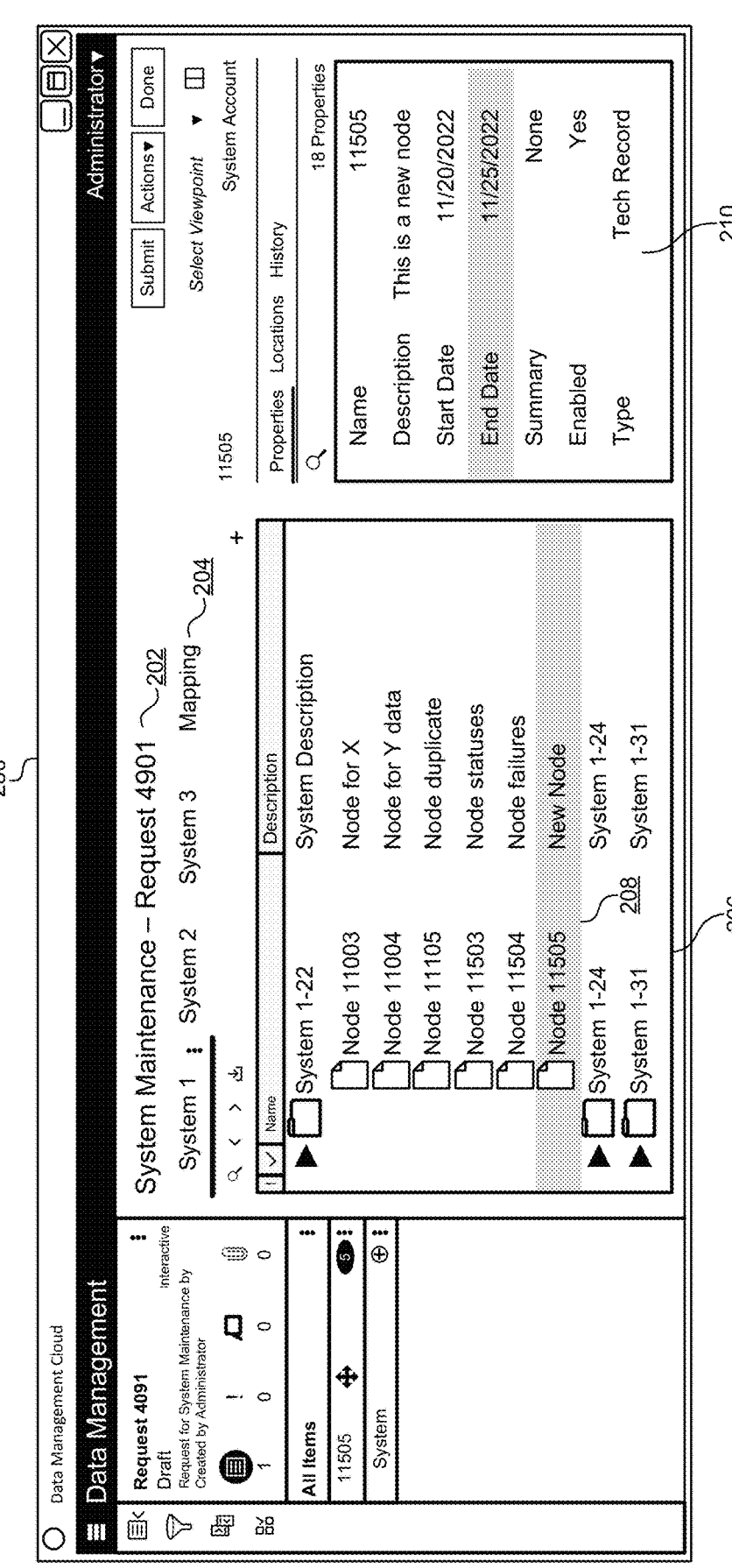
FIG. 2 illustrates an interface for creating a change request, according to some embodiments.

FIG. 2 illustrates an interface 200 for creating a change request, according to some embodiments. The interface 200 may correspond to a particular view 202 of the data hierarchy. The "view" may refer to a particular way of interfacing with the underlying database system that stores the data hierarchy. For example, a view may refer to a database view that displays a subset of the data in the data hierarchy. In some embodiments, the view may more specifically refer to a user-defined workspace that is designed for a particular purpose (e.g., dealing with a certain type of data or a certain class of data transactions). The view may access a subset of the data hierarchy related to this particular purpose. Users of the system 100 may design individual views based individual needs. The interface 200 illustrates a particular view 202 related to "system maintenance."

Within the particular view 202, the interface 200 may also provide a plurality of "viewpoints" 204. The viewpoints 204 may represent another subdivision of the subset of the data hierarchy accessed by the view 202. For example, the viewpoints 204 may divide the maintenance records accessed by the view 202 into maintenance records for individual systems, such as system 1, system 2, system 3, and so forth. The viewpoints 204 may also include a mapping viewpoint that maps records to each other in different viewpoints.

The interface 200 may be used to generate a change request within the particular view 202. As described above, a plurality of requests may be received over time during an evaluation interval. An evaluation interval may be defined as a time interval during which change requests are received but are not yet evaluated or committed. At the end of the evaluation interval, one or more administrators may evaluate the change requests individually or collectively (e.g., as consolidated requests as described below) and approve/ reject the requests. Approved requests may then have their changes committed to the database.

The interface 200 may provide the ability to entry change requests for the data hierarchy through each of the viewpoints 204. Specifically, each individual change request may be entered through and associated with a corresponding one of the viewpoints 204. In the example of FIG. 2, a first change request may be received from the view 202 of the data hierarchy corresponding to system maintenance for "System 1." The first change request may be one of a plurality of change requests received through this particular viewpoint or through any of the other viewpoints 204 or other views available through the interface 200. Each change request may include a field that indicates a viewpoint and/or a view from which the change request originated. Each change request may also include a unique identifier (e.g., "Request 4901").

The interface 200 may display the individual changes that are part of the first change request. For example, the first change request may represent a request to change a first node in the data hierarchy. The first change request may include changes (referred to as "first changes") to various aspects of the data node. In this example, the first changes may include adding a new (or "first") data node to the data hierarchy. A new data node may be added as a copy of an existing data node. The first changes may also include changing values in fields associated with existing data nodes or with new data nodes also added by the first change request.

As used herein, the terms "first," "second," and so forth, are used only to distinguish between components of the same type. For example, a batch of change requests received during an evaluation interval may include the first change request described above, a second change request, a third change request and so forth. The identifiers first, second, etc., are not intended to imply any type of order, importance, or other distinguishing feature between the different components except to indicate that they are different instances of the component.

In FIG. 2, a graphical display 206 of the data hierarchy may show at least some of the relationships between a portion of the nodes in the data hierarchy. For example, the graphical display 206 may include a new node 208 labeled "11505" that is added to the data hierarchy as a part of the first change request. The graphical display 206 may be implemented with a tree view, a graph, a node tree, an indented list, and/or any other type of display that illustrates parent, child, and/or ancestral and descendant relationships between nodes in the data hierarchy. The new node 208 may be highlighted in the graphical display 206 to indicate that the new node 208 is being added by the first change request and is not yet committed to the database.

Selecting the new node 208 may cause a property list 210 for the new node 208 to be displayed in the interface 200. The property list 210 may include individual fields or properties that may be updated or changed through the first change request. For example, the first change request may change a property for the new node 208 and/or for an existing node available through the view 202. Properties or fields that are changed by the first change request may be highlighted in the property list 210.

The interface 200 may also display an affect of the first changes that are part of the first request. For example, although parent or ancestor nodes may not be directly changed by a change request, they may be indirectly affected as data from a child or descendant node is rolled up into the parent node. Individual values in the new node 208 may be changed or added such that the rolled-up values in a parent node are changed. The interface 200 may incorporate validation rules, such as numerical limits to be applied to the first change request. The validation rules may be applied to new nodes and existing parent or ancestor nodes in the data hierarchy. This allows the effect of a proposed change to be evaluated holistically in the data hierarchy.

Although the example in FIG. 2 only illustrates a single change request being made in the interface 200, it should be understood that multiple changes may be made repeatedly in the interface 200. For example, after the first change request illustrated in FIG. 2 has been completed, the "submit" component in the interface 200 may be activated to submit the first change request. Afterwards, subsequent change requests may also be submitted through the interface 200. For example, a second change request that includes second changes to the data hierarchy may be received through the interface after the first change request is submitted. The second changes may be made to a same data node or to different data nodes in the data hierarchy. For example, the second change request may change fields in the same data node that was changed by the first change request. The second change request may add new data nodes to the data hierarchy such that both the first change request and the second change request affect common ancestor or common parent nodes in the data hierarchy when data is rolled up from the changed nodes.

Change requests may be received from many different data sources. For example, a first change request may be received from a first data source and a second change request may be received from a second data source. The first data source may be different from the second data source. For example, the first data source may operate from a different client device from the second data source. These requests may originate from different computing systems, different entities within an organization, different organizations, different users, different data centers, different applications, and/or different geographical locations.

Figure 3:
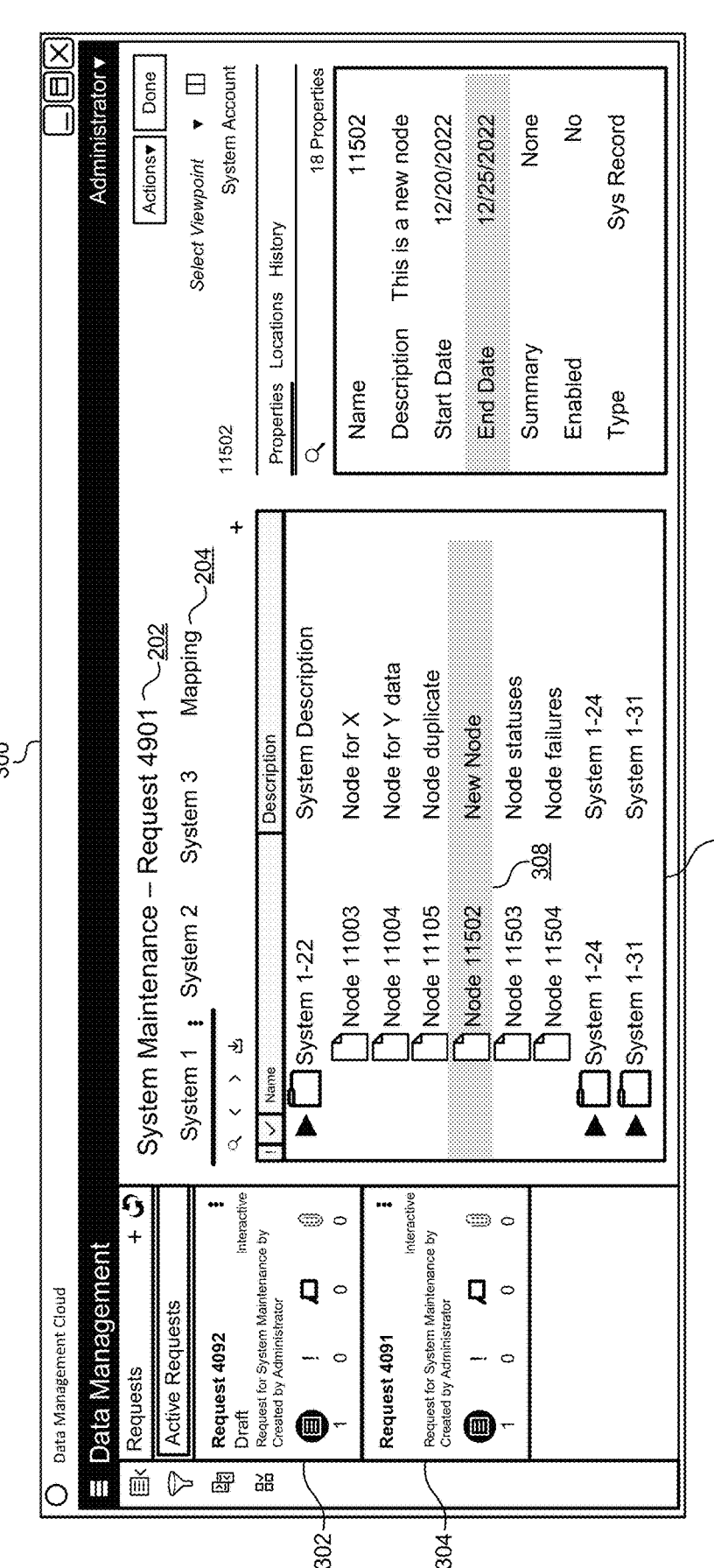
FIG. 3 illustrates an interface that displays a plurality of change requests made within a view, according to some embodiments.

FIG. 3 illustrates an interface 300 that displays a plurality of change requests made within a view, according to some embodiments. The interface 300 may automatically search through a list of submitted change requests and identify any change requests that are associated with the view 202. These change requests may then be displayed in the interface 300. For example, a record 304 corresponding to the first change request described above may be displayed in the interface 300. Additionally, a record 302 corresponding to a second change request made through the view 202 may also be displayed in the interface 300.

The status of the first and second change requests displayed by the record 302, 304 may indicate that their status is "interactive." This may indicate that both the first and second change requests are individually active in the system. For example both the first and second change requests may allow these change requests to be viewed, edited, updated, and committed individually. Selecting either of the records 302, 304 may cause the changes associated with the corresponding change request to be displayed in the interface 300 as illustrated in FIG. 2. For example, the record 302 corresponding to the second change request may be currently selected in FIG. 3. This causes the interface 300 to display the changes associated with the second change request (e.g., copying an existing node to add a new node to the data hierarchy and updating individual fields within the new node). In this example, the second change request adds a new node 308 to the data hierarchy. Note that the new node 208 added by the first change request is not visible in this interface 300 since the new node 208 is part of a separate request. Therefore, the interface 300 allows individual updates to be made to the existing change requests. Accessing the details for one change request may replace details for another change request in the interface 300 such that a single change request may be viewed at a time.

Figure 4:
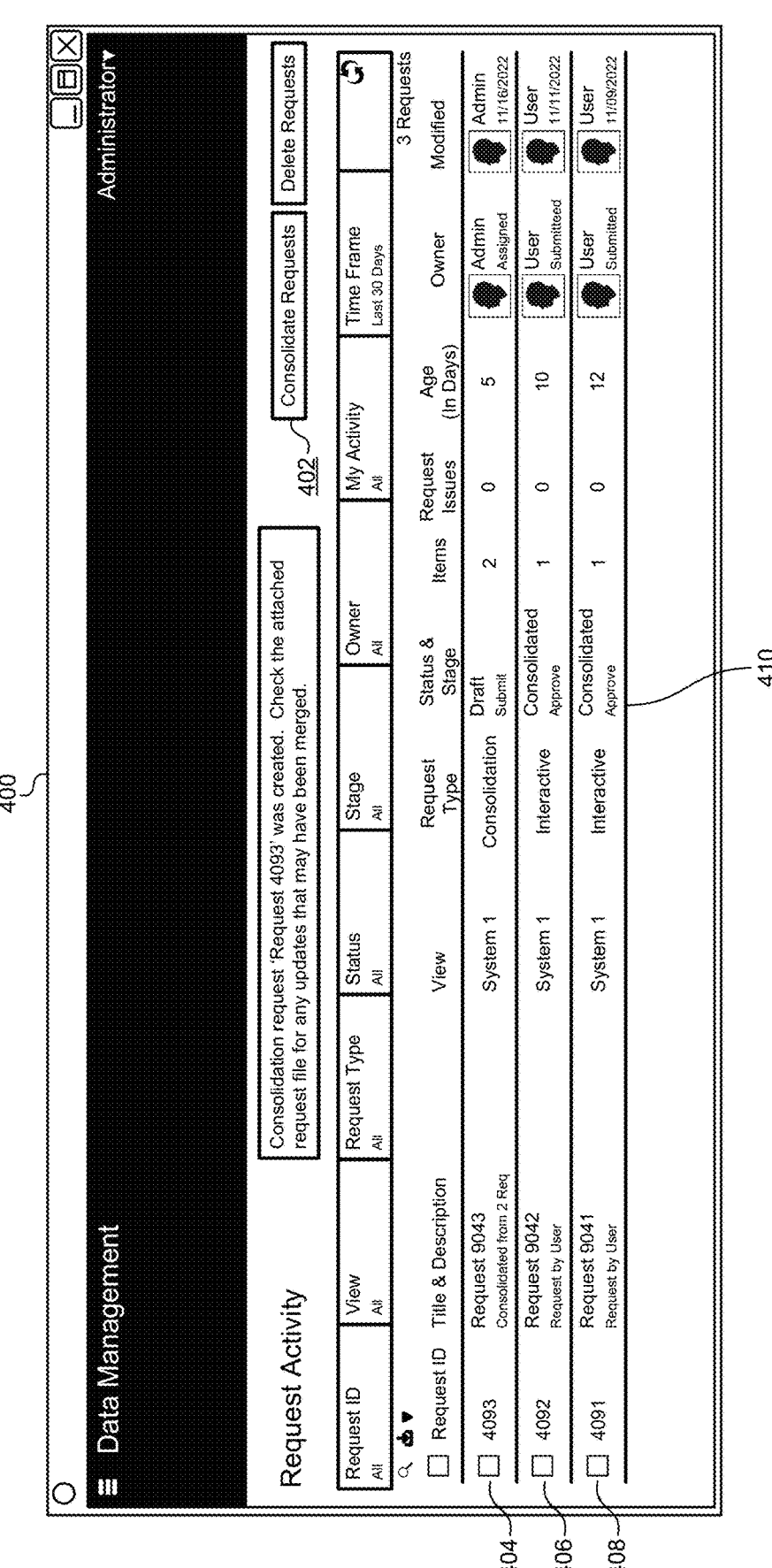
FIG. 4 illustrates an interface for consolidating individual change requests, according to some embodiments.

FIG. 4 illustrates an interface 400 for consolidating individual change requests, according to some embodiments. The interface 400 may be configured to search through all of the pending change requests submitted through a particular view and/or through a particular viewpoint. Typically, the system may consolidate a plurality of change requests all belonging to the same view. For example, the subset of the data hierarchy associated with a view may include common datatypes that may be easily consolidated. Requests from outside of the view may include different datatypes or structures in the data hierarchy that are not easily consolidated together. Thus, the system may search through all of the pending change requests and collect change requests that are associated with a selected view. These change requests may be displayed in a list in the interface 400.

In order to consolidate a plurality of views, the views may be selected and the "Consolidate" control 402 may be activated. For example, request 406 and request 408 may correspond to the first change request and the second change request described above. Selecting these requests and then activating the Consolidate control 402 may generate a new request 404 referred to as a consolidated request. The consolidate control 402 may consolidate all of the selected requests into the consolidated request 404 such that the consolidated request 404 copies and includes all of the changes from each of the consolidated requests. Continuing with the examples from above, the requests 406, 408 may each add new data nodes to the hierarchy and/or edit fields or properties in the new nodes or in other nodes in the data hierarchy. The consolidated request may include the addition of both of these new data nodes and the edits to all of the fields or properties from both of the individual requests 406, 408.

The interface 400 may change a status 410 of these requests to indicate the consolidation. For example, the individual requests 406, 408 may have a status 410 indicating that they have been consolidated. This consolidated status may change a protection field in the data objects for the requests 406, 408 indicating that these requests are now read-only. In some embodiments, the individual requests 406, 408 may still be viewed individually in the interface 200 of FIG. 2. However, the changes illustrated in the interface 200 may be "grayed out" or otherwise modified to indicate that the requested changes are now read-only.

In contrast, the consolidated request 404 may have a status 410 that indicates that request 404 is a consolidated request from multiple individual requests. The interface 400 may also indicate a number of items that were consolidated to form the consolidated request 404. Additionally, the status 418 may indicate that the changes now incorporated into the consolidated request 404 may be both viewed and edited by the user through the consolidated request. As described in detail below, adjustments made to the changes in the consolidated request 404 may be pushed back into the original changes from the original requests 406, 408.

Figure 5:
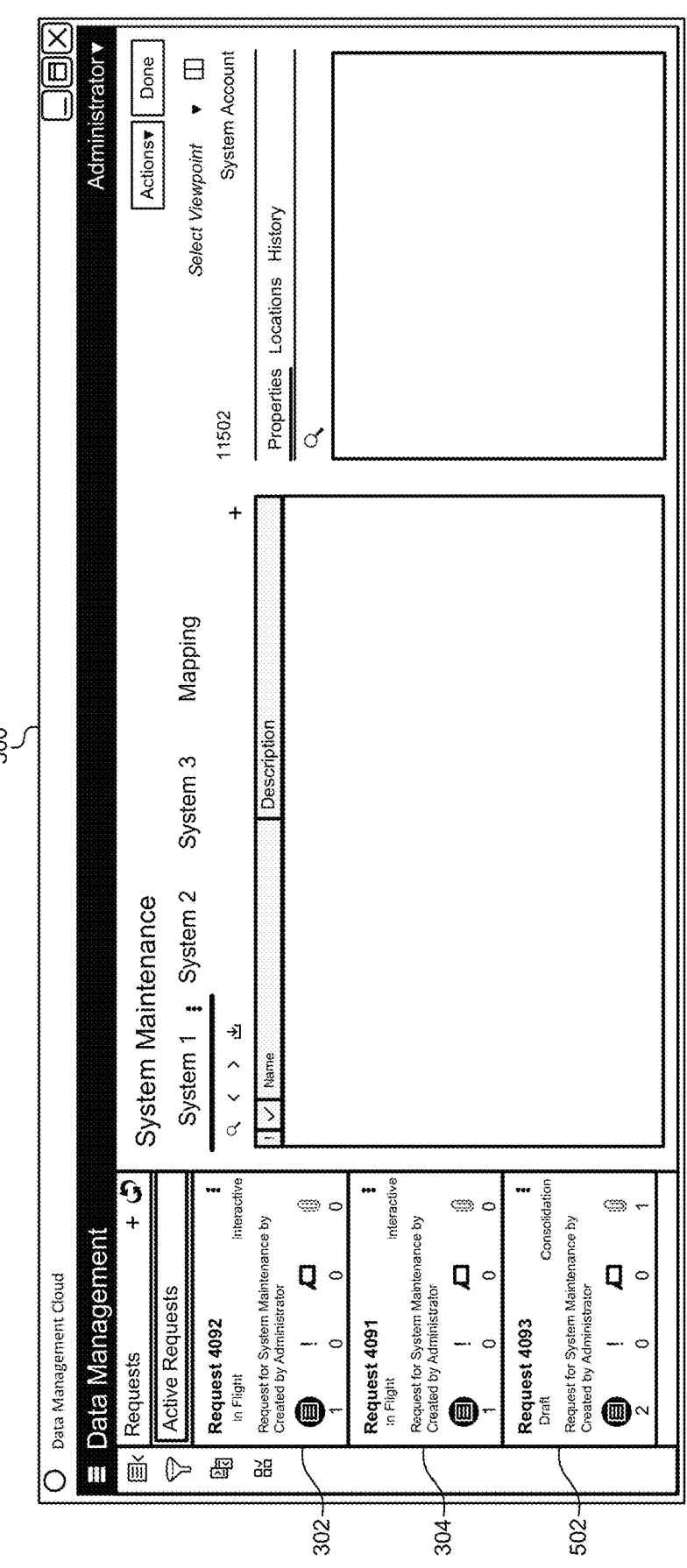
FIG. 5 illustrates the interface for viewing the individual requests and the consolidated request, according to some embodiments.

FIG. 5 illustrates the interface 300 for viewing the individual requests and the consolidated request, according to some embodiments. The interface 300 was also illustrated above in FIG. 3 when only the records 302, 304 for the individual requests were available in the system. However, after consolidating these records 302, 304 for the individual requests in the interface 400 described above, the interface 300 may now include a record 502 for the consolidated request. The user may now select any of the records 302, 304, 502 in order to drill down into the details of these requests. When drilling down into the individual requests, the corresponding changes may be viewed in a read-only display. When drilling down into the consolidated request, the corresponding changes from the individual request may be displayed, edited, and/or updated together in the consolidated request.

Figure 6:
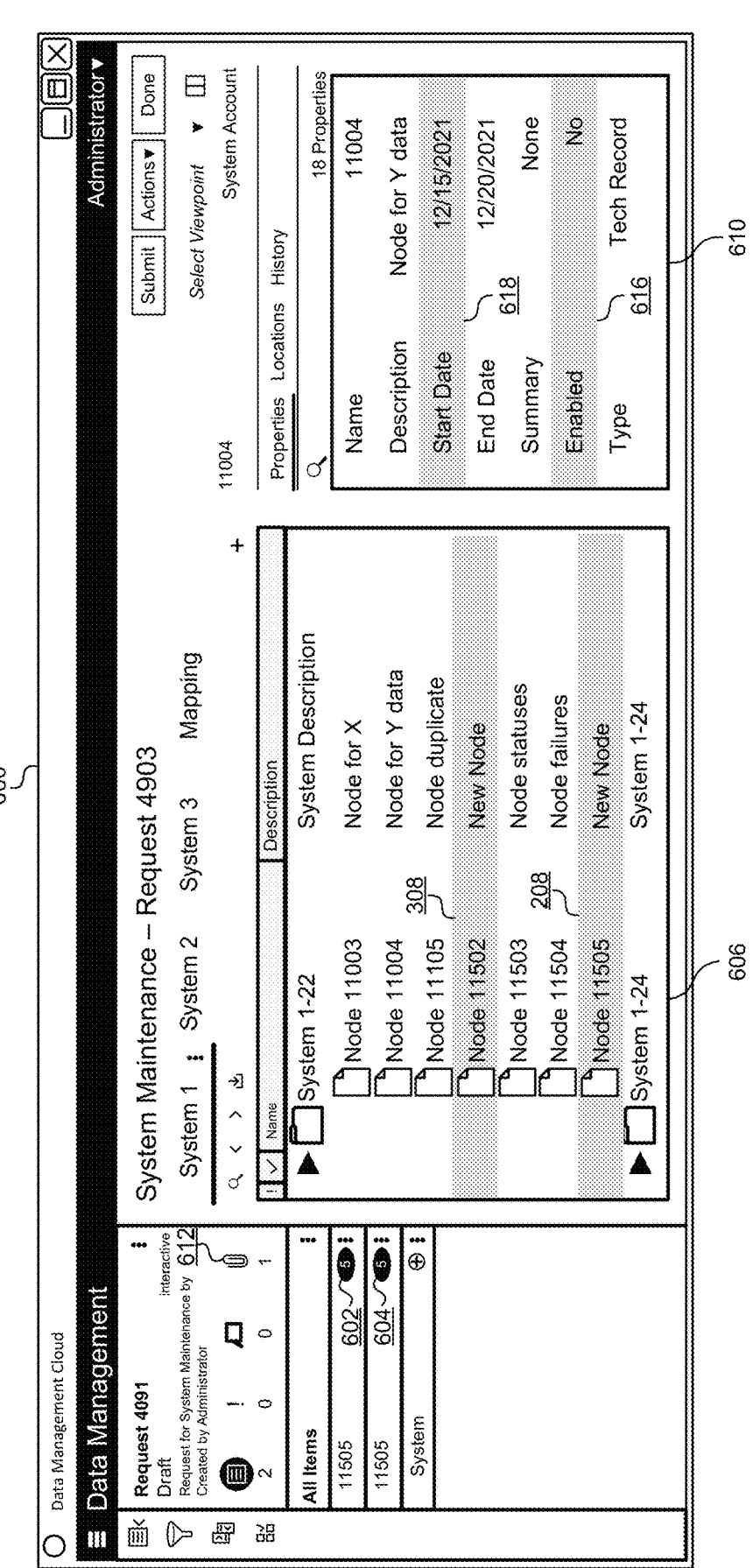
FIG. 6 illustrates an interface for displaying the details of a consolidated request, according to some embodiments.

FIG. 6 illustrates an interface 600 for displaying the details of a consolidated request, according to some embodiments. For example, the user may have selected the record 502 for the consolidated request ("Request 4093") in the interface 500 of FIG. 5. Opening the consolidated request may display all of the changes that were included in both the first request and the second request. For example, a graphical representation of the data hierarchy 606 may include a new node 208 (a "first" data node) added by the first change request together with a new node 308 (a "second" data node) added by the second change request. These nodes added by the individual requests are now viewable and editable together in the consolidated request.

The interface 600 illustrates a cumulative effect of the first request and the second request on the data hierarchy that may be viewed before the consolidated request is approved and/or committed to the database. For example, as multiple new nodes are added to the data hierarchy, the makeup and structure of the data hierarchy with all of the proposed new nodes may be viewed together in the graphical representation of the data hierarchy 606.

Additionally, some embodiments may include data fields with values in each of the new nodes 208, 308. These values may be rolled up into parent nodes in the data hierarchy. Although not shown explicitly in FIG. 6, the user may select an ancestor node to view the cumulative effect of all added descendant nodes. For example, a first node and a second node (e.g., new nodes 208, 308) may share a common ancestor node. New values from the first node and the second node may be rolled up into the common ancestor node. The user may then select the common ancestor node and inspect the rolled up value to see a cumulative effect of the values added by the new nodes from multiple change requests that are now consolidated.

In addition to representing the changes to nodes throughout the hierarchy, the interface 600 may also apply validation rules to any node in the data hierarchy. For example, a common ancestor node of the first node and the second node may have a validation rule that limits a value in the common ancestor node. When the first request and the second request are viewed and/or approved and committed individually, the rolled-up values from these nodes may not individually fail the validation rule. However, after both the first request and the second request are committed, the validation rule may fail based on the cumulative effect of both the first request and the second request. Without the functionality provided by the interface 600, these individual requests may be approved individually, only later to learn that the validation rule now fails for the common ancestor node. These embodiments allow the cumulative effect of both new nodes to be viewed and any validation rules to be applied on those cumulative effects before approval. For example, the validation rule may be executed on the consolidated request illustrated in FIG. 6, and the result (e.g., pass/fail) of the validation rule may be evaluated before the consolidated request is approved and committed to the database.

In addition to adding new nodes, the first and second change requests may also change fields or properties of individual nodes. In the example of FIG. 6, the first and second change requests may change fields within "Node 11004," with the first request changing field 618 and the second request changing field 616. These two changes are displayed and editable together in the property list 610 for that node. Previously, these two changes could only be viewed individually—in isolation from each other—when accessing each of the individual first and second change requests.

In another embodiment, the first change request and the second change request may both provide changes for the same field. For example, both the first and second request may make changes to the same field 616. In this case, the system may detect the collision by examining the individual changes from the first request and the second request. For example, the system may evaluate each of the individual changes ("second" changes) from the second request and determine if any of the individual changes ("first" changes) from the first request edit the same field. If a collision is detected, the system may apply one or more rules to determine whether the first changes or the second changes should be applied to the field 616. The one or more rules for handling a change collision may give precedence to the first change request received, may consider roles or authorizations from a submitting user, may consider data values in the changes themselves, and/or any other property of the change request. These rules may be implemented by individual users based on the needs of a particular embodiment.

Regardless of the type of rule implemented, the interface 600 may indicate when a data collision occurs and allow the reviewer to select one of the changes from one of the requests. Essentially, this allows the user to see the result of the collision rules and/or to override the result of the collision rules if desired. When a collision rule is executed or overridden by a user, indications of such may be added to the consolidated request, the first request, and the second request to indicate which change was accepted and which was rejected as a result of the data collision. This keeps a record of whether the first changes or second changes were used to update the field in this existing data node. This also preserves a record of survivorship for the changes in each of the individual change requests. The record allows for a complete audit and history of changes both proposed and made to the data hierarchy when using consolidated requests.

Figure 7:
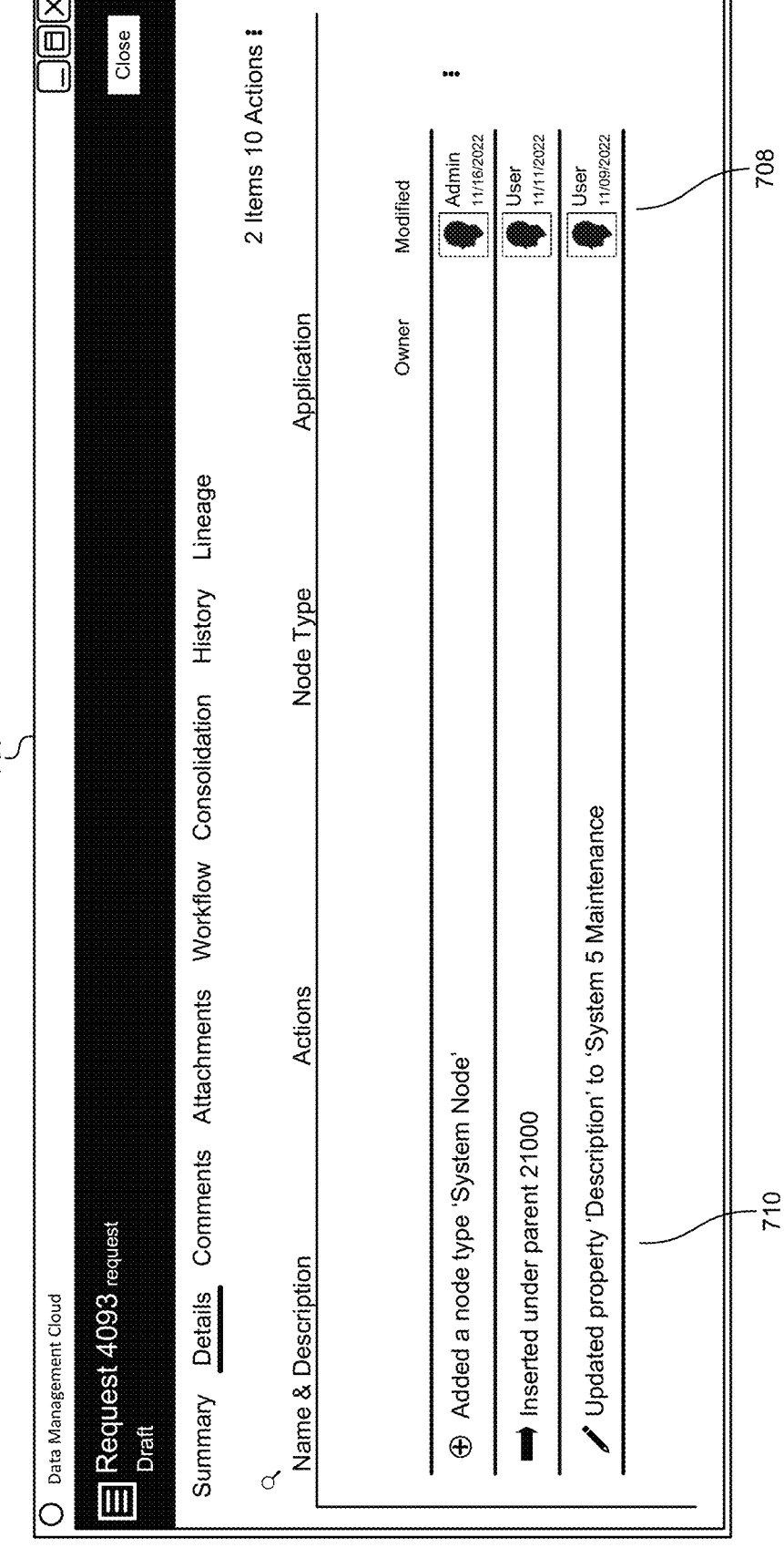
FIG. 7 illustrates an interface that shows the record of actions and changes in the consolidated request, according to some embodiments.

FIG. 7 illustrates an interface 700 that shows the record of actions and changes in the consolidated request, according to some embodiments. An action list 710 may store a record of each action taken that may be associated with the consolidated request. These actions may include the consolidation of multiple individual requests, a list of changes received from each of the individual change requests, a list of user edits made to these changes, an indication of any data collisions and the result of any survivorship rules or user overrides, an approval result or commitment record for the consolidated request, and so forth. The interface 700 may also display metadata for each of these actions, including users 708 submitting requests, approving requests, and/or editing requests. This action log may be populated in real-time and stored as an attachment file to the consolidated request record. For example, the attachment file may include a spreadsheet that may be exported or viewed separately outside of the interface 700.

Figure 8:
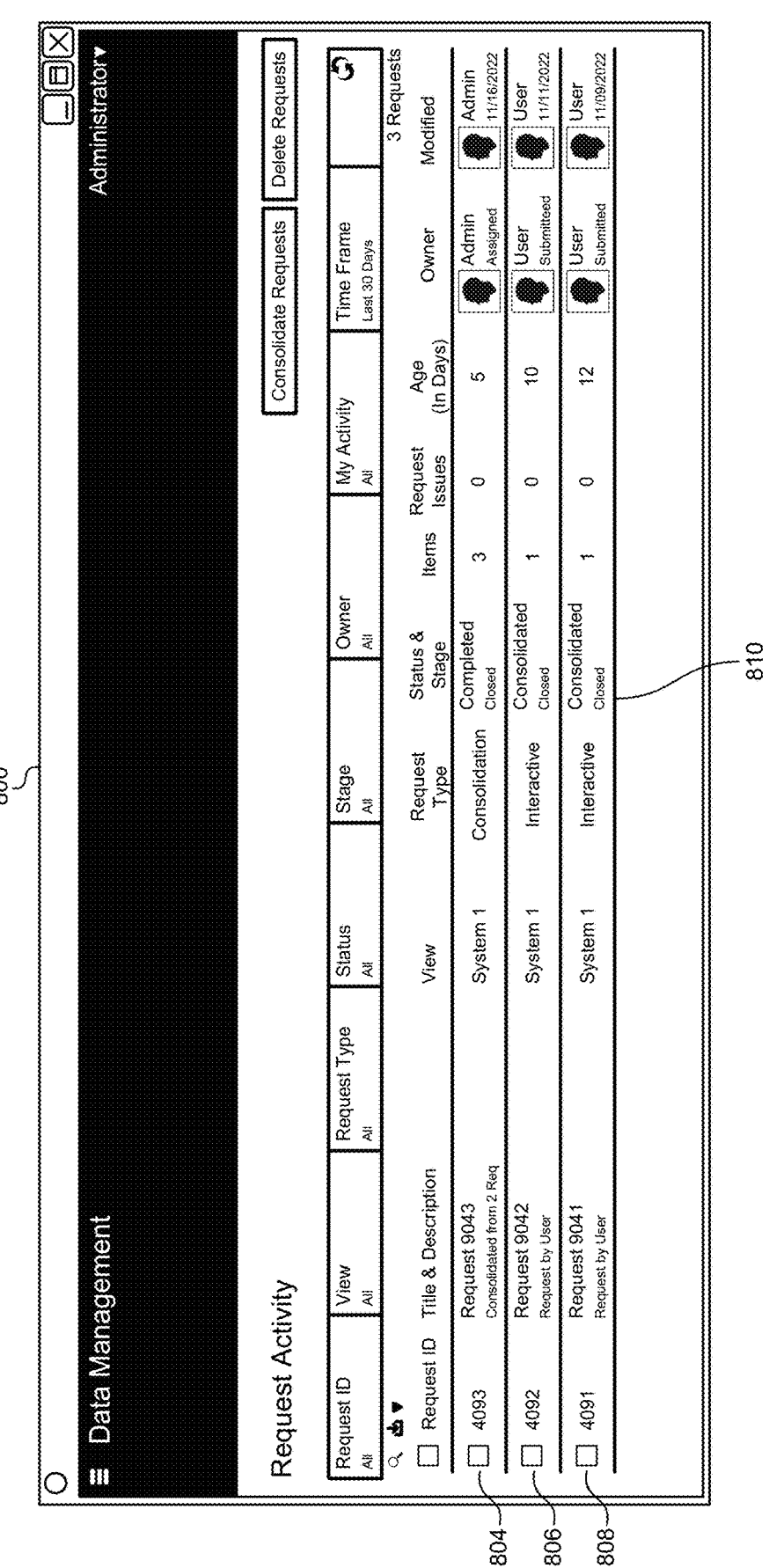
FIG. 8 illustrates an interface showing statuses for a consolidated request after approval, according to some embodiments.

FIG. 8 illustrates an interface 800 showing statuses for a consolidated request after approval, according to some embodiments. One of the benefits of using consolidated requests is the ability to not only view and edit the changes in a consolidated request together, but also the ability to approve these changes together and commit them to the database. For example, the user may activate the "Submit" command in the interface 600 after reviewing and/or editing the changes in the consolidated request. In the example above, this command may commit the first changes and the second changes from the individual change requests to the data hierarchy. A record of this approval and commit action may be made in each of the participating requests. For example, this command may change a status field in the consolidated request, the first request, and the second request indicate that the changes have been committed and approved in each request.

After a plurality of requests have been consolidated, the consolidated request may be handled exclusively without requiring any maintenance of the previous individual requests. For example, when the consolidated request is approved and committed, the system may automatically change the status of the previous individual requests. The interface 800 illustrates how the closure of the consolidated request 804 automatically changes the statuses 810 of the first request 808 and the second request 806 to be closed.

Although not shown explicitly in the interface 800, some embodiments may also provide a mechanism for de-consolidating a consolidated request. For example, instead of approving a consolidated request, the user may provide a command through the interface 800 to discard the consolidated request entirely. In response to receiving this command, the system may delete the consolidated request and change the status of the first request and the second request to be individually reviewed, edited, and/or committed to the data hierarchy. In effect, this rolls back the consolidation of these requests and allows a user to individually view and edit these requests separately. The statuses may be changed on these individual requests such that the requests may be editable again.

Figure 9A:
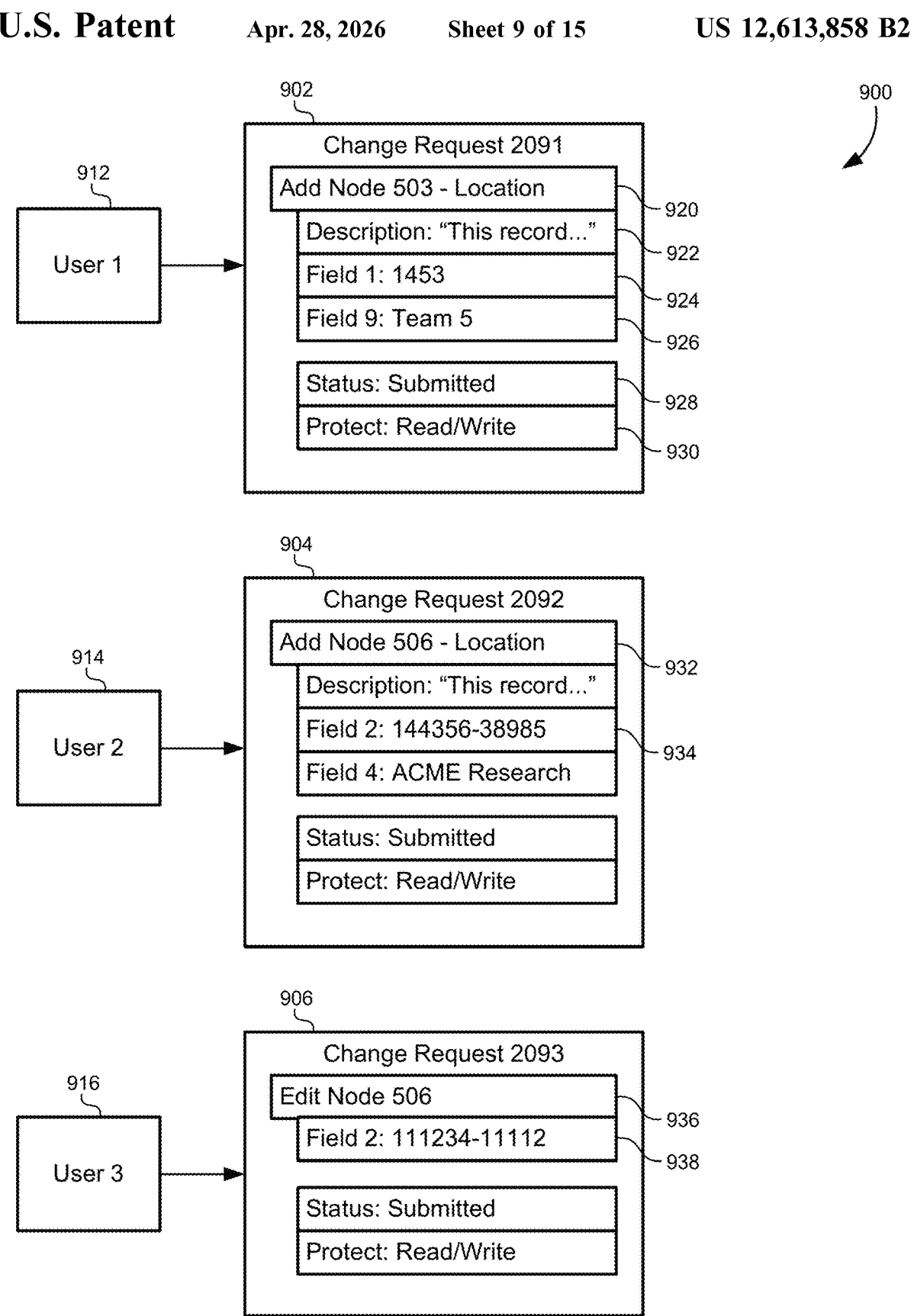
FIG. 9A illustrates data objects representing change requests, according to some embodiments.

FIG. 9A illustrates data objects representing change requests, according to some embodiments. For example, a first request 902 may be received from a first data source 912. The first request 902 may include first changes that add a new node to the data hierarchy. For example, the first changes may include a change 920 to add the new node, and changes 922, 924, 926 to edit data fields in the new node. A status 928 may be stored in the first request 902 indicating whether the first change request has been submitted, approved, committed, consolidated, and so forth. Since the first change request 902 is currently unconsolidated, this record may include a read/write status that allows the first change request 902 to be edited individually.

Similarly, a second change request 904 may be received from a second data source 914. The second change request 904 may include a change 932 to add another new node to the data hierarchy, along with a change 934 to a field in the new node. A third change request 906 may be received from a third data source 916 that edits fields in an existing node. These third changes 936, 938 may indicate a particular node and particular fields to be edited, along with new values for those fields. As described above, each of these data objects may be received during an evaluation interval such that they may be received at different points in time, but later evaluated and reviewed together in a batch at the end of the evaluation interval. In some embodiments, these data objects may be stored together in a database as records.

Figure 9B:
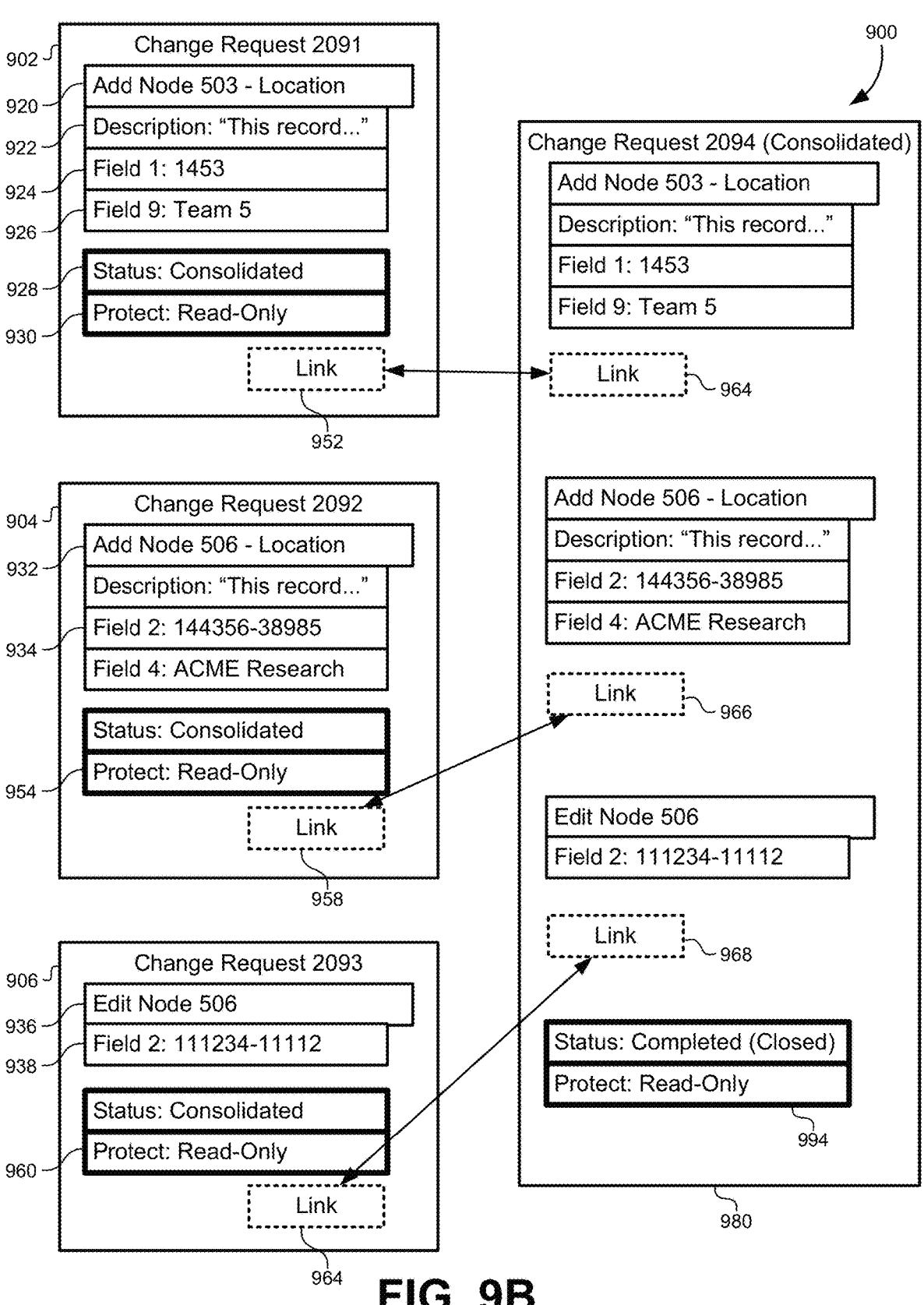
FIG. 9B illustrates the consolidation of the change requests into a consolidated request, according to some embodiments.

FIG. 9B illustrates the consolidation of the change requests into a consolidated request, according to some embodiments. When a command is received to consolidate the plurality of individual requests, a new object may be created for the consolidated request 908. This new object may copy the changes from the individual requests so that the changes exist in both the individual requests and the consolidated request. For example, the first, second, and third changes from the first change request 902, the second change request 904, and the third change request 906 may be copied over into the consolidated change request 980.

When the consolidation occurs, the protection statuses 928, 954, 960 in each of the individual requests may be changed to be Read-Only. Similarly, another status for each of the individual requests may also be changed to be "Consolidated" indicating that they are no longer evaluated as individual requests, but are instead part of a consolidated request. In some embodiments, links may be embedded in the consolidated request that point back to the individual requests. For example, a link 964 may be embedded in the consolidated request 980 pointing back to the first request 902, a link 966 may point back to the second request 904, and a link 968 may point back to the third request 906. Optionally, links may also be embedded in each of the individual requests that point to the consolidated request. For example, a link 952 may be embedded in the first change request 902 pointing to the consolidated request 980. Similar links 958, 964 may also be embedded in the second request 904 and the third request 906, respectively.

These links may allow changes to the consolidated request 980 to be propagated back to the individual change requests such that each of the individual change requests maintains a complete record of its changes, including alterations and approvals made through the consolidated request. This allows consolidation process to be transparent to users submitting the original change requests. For example, a user submitting the first change request may view the first change request and see adjustments to their proposed changes, results of collisions with other change requests, an approval or commit action, and so forth, without referencing the object for the consolidated request. Alternatively, some embodiments may instead record all changes exclusively in the consolidated request 980 without propagating any changes back to the first request 902, the second request 904, etc. Instead, the record of these changes may be stored in the consolidated request 980 and linked to the original requests.

Figure 9C:
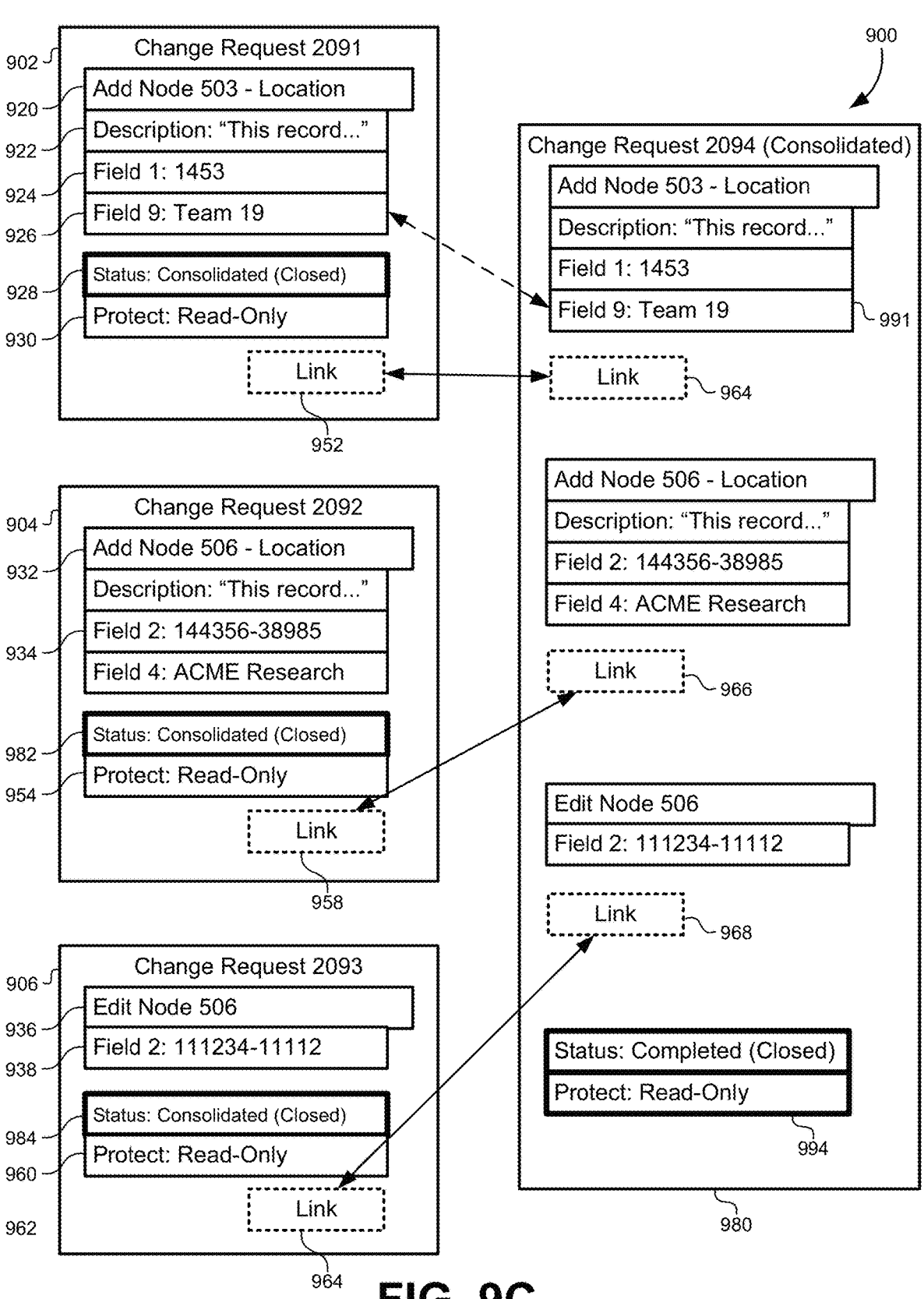
FIG. 9C illustrates changes made to the consolidated request being propagated back to the individual requests, according to some embodiments.

FIG. 9C illustrates changes made to the consolidated request being propagated back to the individual requests, according to some embodiments. For example, a change may be received for the consolidated request 980 for field 991. Field 991 may have been copied over from the first change request 902 when the first was consolidated. As described above, the consolidated request 980 may allow the user to alter changes in the consolidated request that were received originally from the first change request 902. Using the link 964, the change to the field 991 may be propagated back to the original field 926 in the first change request 902. Thus, changes to a field in the data object for the consolidated request may also be stored in the data object for the original first request.

When the consolidated request 980 is closed, the links 964, 966, 980 may be used to further propagate any changes back to the original requests into change the statuses of the original requests. For example, when the consolidated request 980 is closed, the statuses 994 of the consolidated request 980 may be changed to "Closed" and/or "Read-Only." The links 964, 966, 968 may then be used to propagate this change in status back to the original requests.

Figure 10:
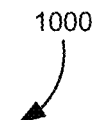
FIG. 10 illustrates a flowchart of a method for consolidating change requests and data hierarchy, according to some embodiments.
Figure 10:
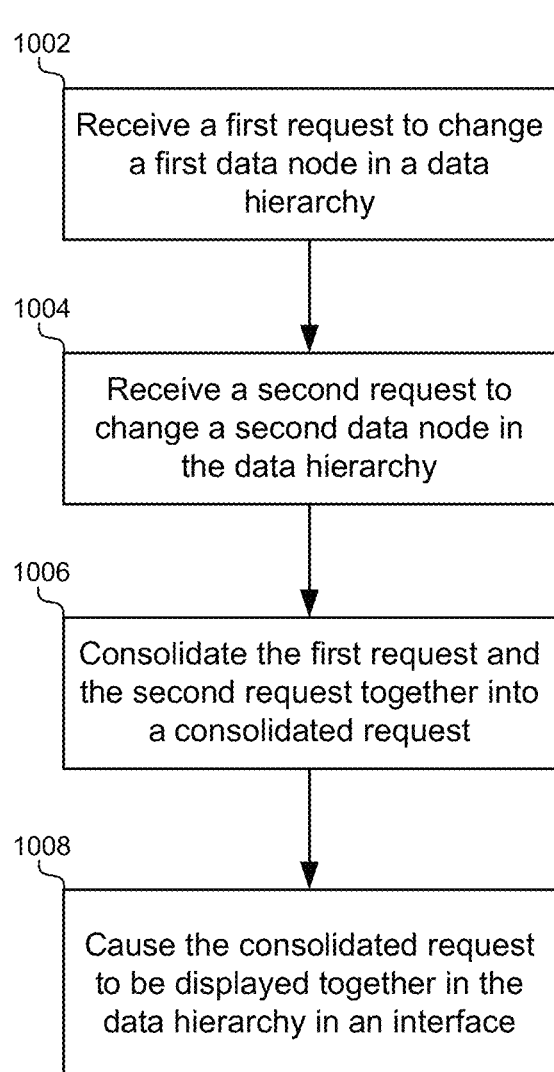

FIG. 10 illustrates a flowchart 1000 of a method for consolidating change requests and data hierarchy, according to some embodiments. The method may include receiving a first request to change a first data node in a data hierarchy (1002). The method may also include receiving a second request to change a second data node in the data hierarchy (1004). The method may further include consolidating the first request and the second request together into a consolidated request (1006). The consolidated request may include first changes requested by the first request and second changes requested by the second request. The method may additionally include causing the consolidated request to be displayed in an interface (1008). The first changes and the second changes in the data hierarchy may be displayed together in the interface.

It should be appreciated that the specific steps illustrated in FIG. 10 provide particular methods of consolidating change requests in a data hierarchy according to various embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
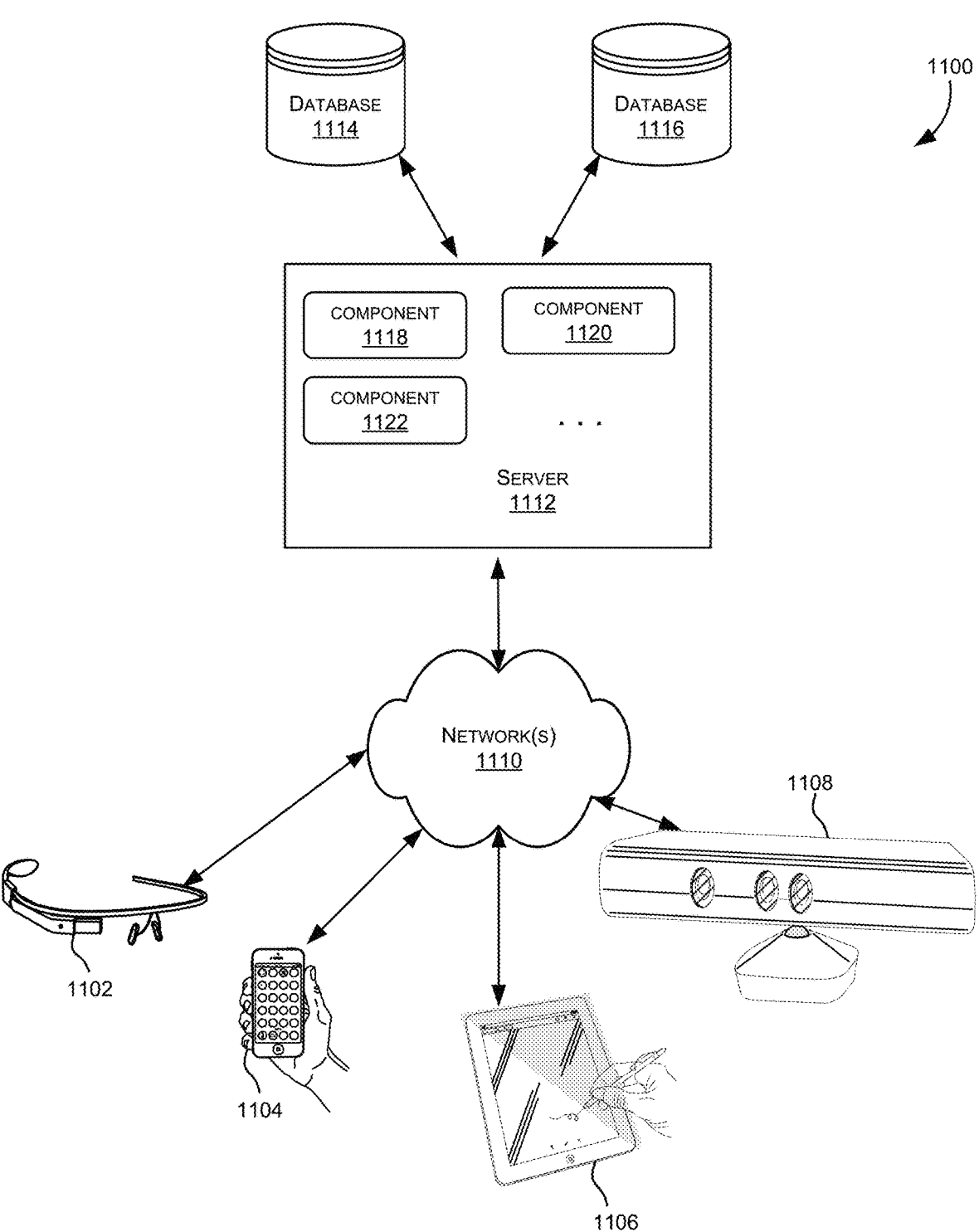
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104,

1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
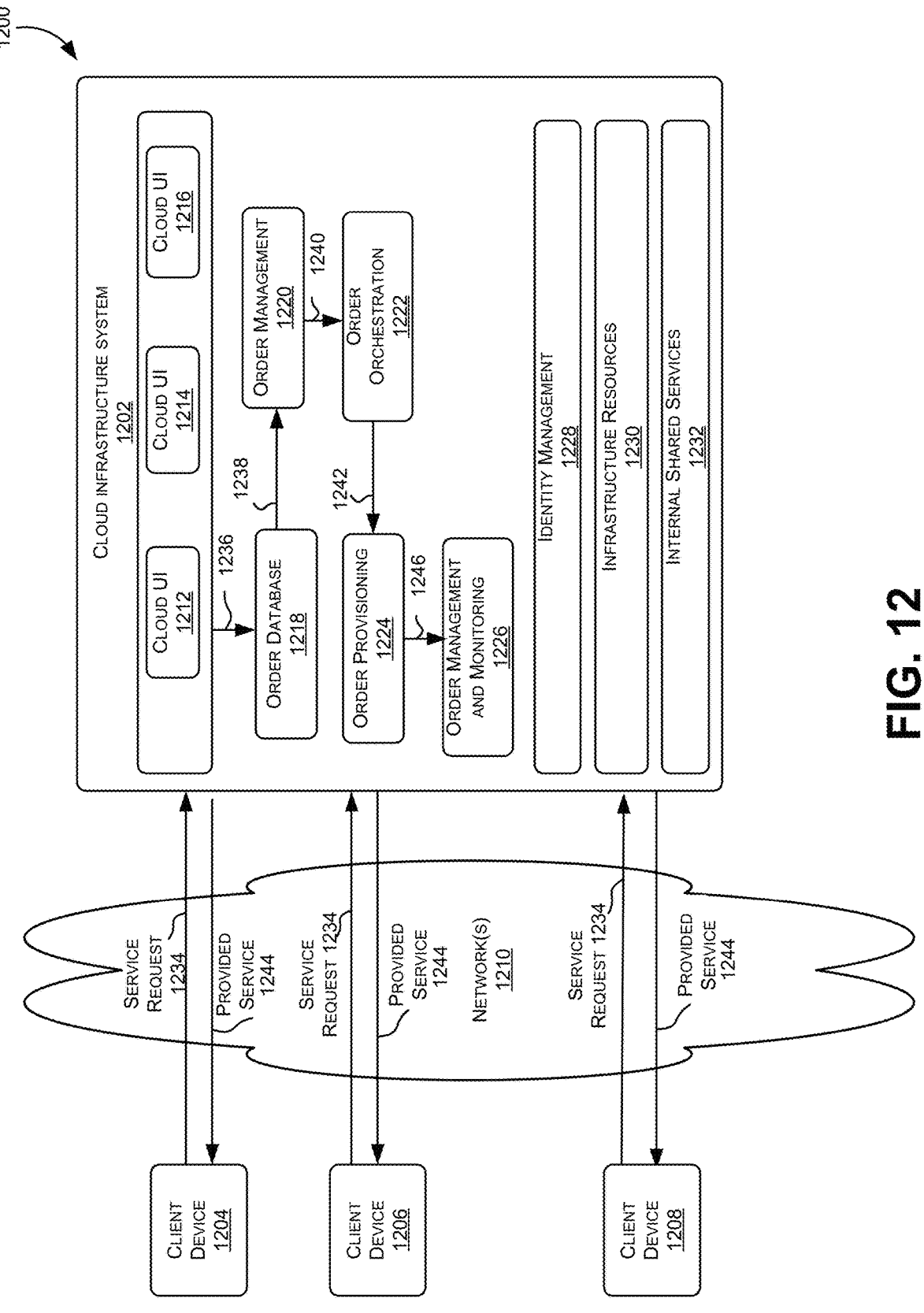
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the system shown in the figure is only one example of a cloud infrastructure system that may incorporate some embodiments. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
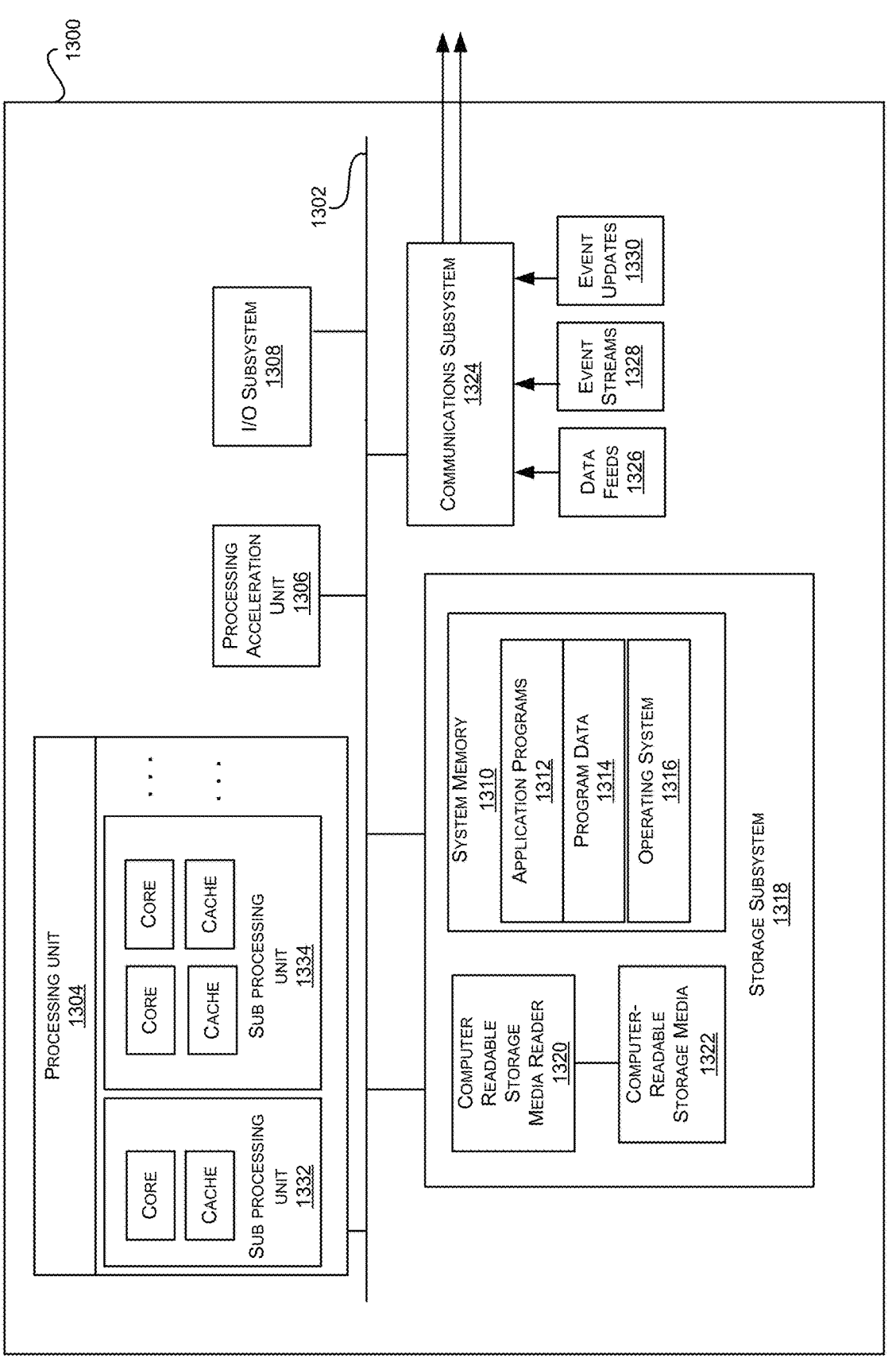
FIG. 13 illustrates an exemplary computer system, in which various embodiments may be implemented.

FIG. 13 illustrates an exemplary computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with some embodiments.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or micro-code, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:

receiving a first request to change a first data node in a data hierarchy;

receiving a second request to change a second data node in the data hierarchy;

consolidating the first request and the second request together into a consolidated request, wherein the consolidated request comprises first changes requested by the first request and second changes requested by the second request;

embedding a link to the consolidated request in the first request and in the second request; and causing the consolidated request to be displayed in an interface, wherein the first changes and the second changes in the data hierarchy are displayed together in the interface.

2. The non-transitory computer-readable medium of claim 1, wherein the first changes comprise newly adding a first data node to the data hierarchy.

3. The non-transitory computer-readable medium of claim 2, wherein:

the second changes comprise newly adding a second data node to the data hierarchy; and the operations further comprise:

displaying a graphical representation of the data hierarchy that includes the first data node and the second data node in the graphical representation of the data hierarchy illustrating a cumulative effect of the first request and the second request on the data hierarchy before the consolidated request is committed.

4. The non-transitory computer-readable medium of claim 2, wherein:

the second changes comprise adding a second data node to the data hierarchy;

the data hierarchy is associated with a validation rule for a common ancestor node of the first data node and the second data node; and the operations further comprise:

rolling up values from the first data node to the common ancestor node;

rolling up values from the second data node to the common ancestor node;

validating a rolled-up value of the common ancestor node using the validation rule illustrating a cumulative effect of the first request and the second request on the common ancestor node before the consolidated request is committed.

5. The non-transitory computer-readable medium of claim 1, wherein the first changes comprise changing a field in an existing data node in the data hierarchy.

6. The non-transitory computer-readable medium of claim 5, wherein:

the second changes comprise also changing the field in the existing data node in the data hierarchy; and the operations further comprise:

detecting a collision of the first changes and the second changes with respect to the field in the existing data node;

applying one or more rules to determine whether the first changes or the second changes update the field in the existing data node; and adding indications to the first request and the second request that indicate whether the first changes or the second changes updated the field in the existing data node.

7. The non-transitory computer-readable medium of claim 1, wherein:

the first request is received from a first data source; and the second request is received from a second data source that operates from a different client device from the first data source.

8. The non-transitory computer-readable medium of claim 1, wherein:

the first request is received from a view of the data hierarchy;

the second request is received from the view of the data hierarchy; and the view of the data hierarchy represents a user-defined workspace that accesses a subset of the data hierarchy.

9. The non-transitory computer-readable medium of claim 8, wherein the operations further comprise:

identifying a plurality of change requests received from the view of the data hierarchy, wherein the plurality of change requests comprises the first request and the second request;

presenting the plurality of change requests together in the interface;

receiving a selection of the first request through the interface;

receiving a selection of the second request through the interface;

receiving a command to consolidate the first request and the second request through the interface; and consolidating the first request and the second request together into the consolidated request in response to receiving the command.

10. The non-transitory computer-readable medium of claim 1, wherein the operations further comprise:

receiving a command through the interface approving the consolidated request;

in response to receiving the command, committing the first changes and the second changes to the data hierarchy; and changing status fields of the consolidated request, the first request, and the second request to indicate that the first changes and the second changes have been committed.

11. The non-transitory computer-readable medium of claim 1, wherein the operations further comprise:

receiving a command through the interface to discard the consolidated request;

in response to receiving the command, deleting the consolidated request and reinstating the first request and the second request to be individually reviewed and committed to the data hierarchy.

12. The non-transitory computer-readable medium of claim 1, wherein causing the consolidated request to be displayed comprises:

displaying records representing the first request, the second request, and the consolidated request together in a list in the interface, wherein the list indicates that the first request and the second request have been consolidated.

13. The non-transitory computer-readable medium of claim 1, wherein the operations further comprise:

changing statuses of the first request and the second request to be read-only after the first request and the second request are consolidated into the consolidated request.

14. The non-transitory computer-readable medium of claim 1, wherein the operations further comprise:

embedding links to the first request and the second request in the consolidated request.

15. The non-transitory computer-readable medium of claim 1, wherein consolidating the first request and the second request together into the consolidated request comprises:

copying fields from a first object representing the first request into a consolidated object representing the consolidated request;

copying fields from a second object representing the second request into the consolidated object representing the consolidated request; and storing the first object, the second object, and the consolidated object in a database.

16. The non-transitory computer-readable medium of claim 15, wherein the operations further comprise:

receiving a change to the consolidated request through the interface, wherein the change is related to the first request;

storing the change to the consolidated object representing the consolidated request; and storing the change in the first object representing the first request.

17. The non-transitory computer-readable medium of claim 1, wherein consolidating the first request and the second request together into the consolidated request comprises:

generating a file attachment for the consolidated request that records data conflicts between the first request and the second request, resolutions of the data conflicts between the first request and the second request, changes made to the consolidated request, and committing the consolidated request, the first request, and the second request.

18. The non-transitory computer-readable medium of claim 1, wherein causing the consolidated request to be displayed comprises:

causing a number of changes in the first changes by the first request to be displayed;

causing a number of changes in the second changes by the first request to be displayed; and causing a number of changes in the consolidated request to be displayed, wherein the number of changes in the consolidated request aggregates the number of changes in the first changes in the number of changes in the second changes.

19. A method of consolidating change requests in a data hierarchy, the method comprising:

receiving a first request to change a first data node in a data hierarchy;

receiving a second request to change a second data node in the data hierarchy;

consolidating the first request and the second request together into a consolidated request, wherein the consolidated request comprises first changes requested by the first request and second changes requested by the second request;

embedding a link to the consolidated request in the first request and in the second request; and causing the consolidated request to be displayed in an interface, wherein the first changes and the second changes in the data hierarchy are displayed together in the interface.

20. A system comprising:

one or more processors; and one or more memory devices comprising instructions that, when executed by the one or more processors, cause the one or more processors to perform operations comprising:

receiving a first request to change a first data node in data hierarchy;

receiving a second request to change a second data node in data hierarchy;

consolidating the first request and the second request together into a consolidated request, wherein the consolidated request comprises first changes requested by the first request and second changes requested by the second request;

embedding a link to the consolidated request in the first request and in the second request; and causing the consolidated request to be displayed in an interface, wherein the first changes and the second changes in the data hierarchy are displayed together in the interface.

* * * * *